(12) United States Patent
Kawakami et al.

(10) Patent No.: US 11,209,911 B2
(45) Date of Patent: Dec. 28, 2021

(54) DATA REPLACEMENT APPARATUS AND PROGRAM FOR HEAD MOUNTED DISPLAY

(71) Applicant: DWANGO Co., Ltd., Tokyo (JP)

(72) Inventors: Nobuo Kawakami, Tokyo (JP);
Kentarou Matsui, Sapporo (JP);
Shinnosuke Iwaki, Tokyo (JP);
Takashi Kojima, Tokyo (JP); Naoki Yamaguchi, Sapporo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 17/059,312

(22) PCT Filed: Jun. 14, 2019

(86) PCT No.: PCT/JP2019/023728
§ 371 (c)(1),
(2) Date: Nov. 27, 2020

(87) PCT Pub. No.: WO2019/240276
PCT Pub. Date: Dec. 19, 2019

(65) Prior Publication Data
US 2021/0165495 A1    Jun. 3, 2021

(30) Foreign Application Priority Data
Jun. 14, 2018  (JP) .............................. JP2018-113563

(51) Int. Cl.
*G06F 3/01* (2006.01)
*G02B 27/01* (2006.01)
(52) U.S. Cl.
CPC ......... *G06F 3/017* (2013.01); *G02B 27/0172* (2013.01); *G06F 3/011* (2013.01)

(58) Field of Classification Search
CPC ...... G06F 3/017; G06F 3/011; G02B 27/0172
See application file for complete search history.

(56) References Cited

U.S. PATENT DOCUMENTS

2015/0153825 A1*  6/2015  Lee ................... G02B 27/0172
345/8

FOREIGN PATENT DOCUMENTS

| JP | 6212666 | * 3/2017 | ............. G06F 13/00 |
| JP | 6212666 B1 | 10/2017 | |

(Continued)

OTHER PUBLICATIONS

Translation of International Search Report and Written Opinion dated Aug. 13, 2019 and Written Opinion in corresponding application No. PCT/JP2019/023728; 6 pgs.

(Continued)

*Primary Examiner* — Andrey Belousov
(74) *Attorney, Agent, or Firm* — Maier & Maier, PLLC

(57) ABSTRACT

A data replacement apparatus according to one aspect of the present invention includes an acquisition unit, a determination unit, and a replacement unit. The acquisition unit acquires first control data having a value based on the position of a first device which can be mounted on a user's head and the position of a second device which can be gripped by a user. The determination unit determines whether or not a prescribed condition is satisfied. The replacement unit replaces the first control data with second control data when it is determined that the condition is satisfied. The second control data has a value not based on the position of the first device and/or the position of the second device.

14 Claims, 5 Drawing Sheets

(56) References Cited

FOREIGN PATENT DOCUMENTS

| | | | |
|---|---|---|---|
| JP | 6257825 | B1 | 1/2018 |
| JP | 2018-74294 | A | 5/2018 |
| WO | 2016/002318 | A1 | 1/2016 |

OTHER PUBLICATIONS

Decision to Grant a Patent dated Mar. 12, 2019 of corresponding Japanese application No. 2018-113563; 5 pgs.
Notice of Reasons for Refusal dated Oct. 23, 2018 of corresponding Japanese application No. 2018-113563; 6 pgs.

* cited by examiner

DATA REPLACEMENT APPARATUS AND PROGRAM FOR HEAD MOUNTED DISPLAY

FIELD

The present invention relates to virtual reality (VR), augmented reality (AR), or mixed reality (MR) technology.

ART

Conventionally, it is known that a virtual experience, that is, a VR experience, is shared between a plurality of users wearing a head mounted display (HMD) via a network. Specifically, it is known that a posture of an avatar, which is an alter ego of the user in a virtual space, is controlled according to a posture (for example, gaze, head orientation, and the like) of the user.

An object of Patent Document 1 is ([0005]) to improve a problem that the second user feels uncomfortable ([0004]) for the first avatar (first user) not reacting because the second user does not know that the first user is not wearing the HMD when the first user has removed the HMD, and provide the user with a rich virtual experience. Specifically, in Patent Document 1, it is described that it is determined whether or not the user A has removed the HMD 110 based on inclination information of the HMD 110 [0095], non-wearing information is generated when it is determined that the user A has removed the HMD 110 [0100], and the user terminal 1B sets the facial expression of the avatar 4A to the default facial expression after receiving the non-wearing information [0101]. In addition, it is also described that it is determined whether or not the user A is wearing the HMD 110 again [0113], and when being worn, the facial expression of the avatar 4A is updated [0115].

CITATION LIST

Patent Document

Patent Document 1: Japanese Patent No. 6,212,666

SUMMARY

When controlling a posture of an avatar of a user in a virtual space according to the posture of the user, the avatar is in danger of taking a posture that the user does not intend, such as an unnatural posture. In particular, when the HMD displays a virtual space image from a first-person viewpoint, the user cannot directly see an appearance of his or her avatar, and thus it is difficult for the user to detect an abnormality and try to correct the abnormality.

When a user's avatar takes an unnatural posture, the user is likely to feel embarrassed or uncomfortable when he or she notices the fact, and also other users are likely to be awakened as the degree of completion of the virtual space including the avatar is low. This may occur not only in the VR experience but also in the whole of experience (hereinafter, referred to as virtual experience) including virtual elements such as AR or MR.

An object of the invention is to prevent deterioration of a user's virtual experience due to an avatar image.

A data replacement apparatus according to an aspect of the invention includes an acquisition unit, a determination unit, and a replacement unit. The acquisition unit acquires first control data having a value based on a position of a first device which can be mounted on a user's head and a position of a second device which can be gripped by a user. The determination unit determines whether or not a prescribed condition is satisfied. The replacement unit replaces the first control data with second control data when it is determined that the condition is satisfied. The second control data has a value not based on the position of the first device and/or the position of the second device.

According to the invention, it is an object to prevent deterioration of a user's virtual experience due to an avatar image.

DETAILED DESCRIPTION

Figure 1:
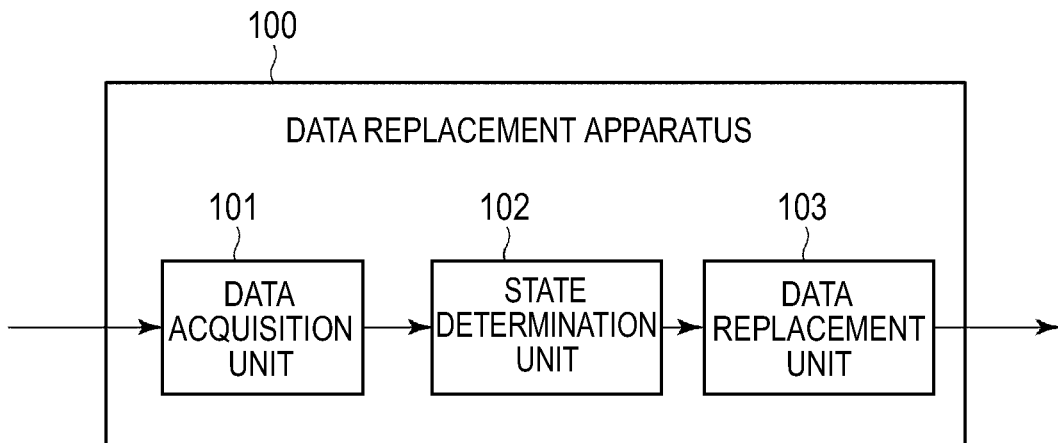
FIG. 1 is a block diagram illustrating a data replacement apparatus according to an embodiment.

Hereinafter, a description of embodiments will be given with reference to the drawings. Incidentally, in the followings, the same or similar reference numerals will be given to the same or similar elements as those already described, and redundant description will be basically omitted. For example, when a plurality of the same or similar elements are present, the same reference numeral may be used to describe each element without distinguishing each element, and a branch number may be used in addition to the same reference numeral to distinguish and describe each element.

Embodiment

Figure 2:
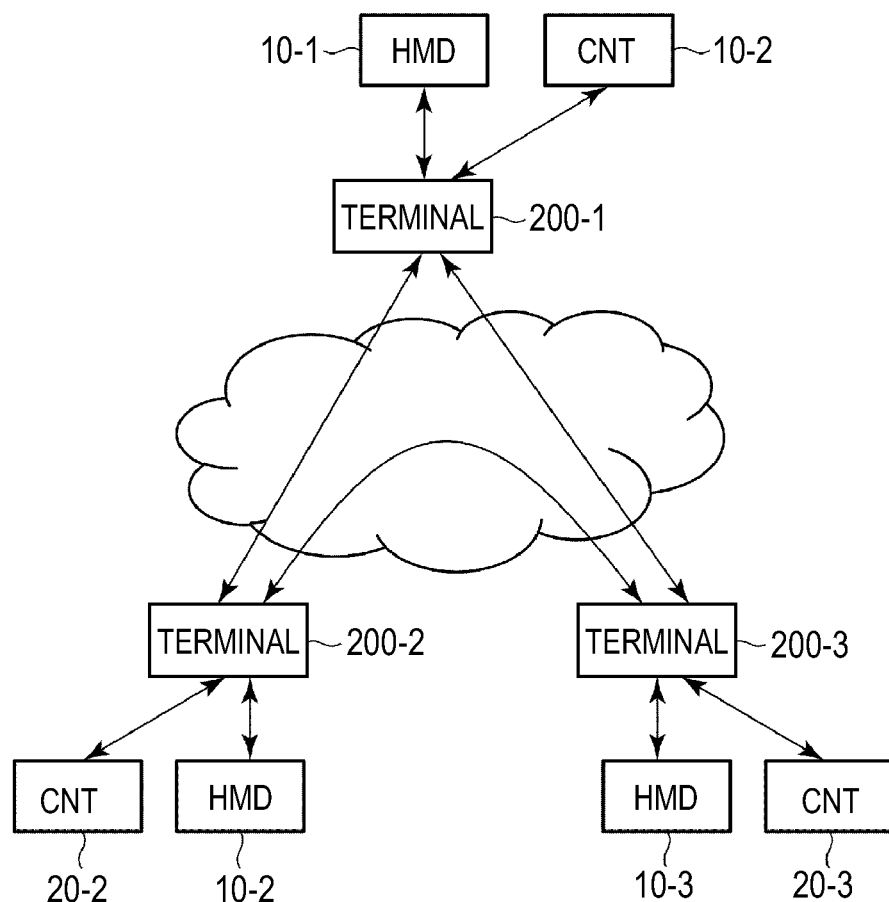
FIG. 2 is a block diagram illustrating a virtual experience sharing system including a terminal incorporating the data replacement apparatus according to the embodiment.

A data replacement apparatus according to the embodiment can be incorporated in a terminal configuring a virtual experience sharing system. Such a system is illustrated in FIG. 2. In this system, terminals 200 are connected to each other via a network such as the Internet and can transmit and receive data.

Incidentally, in the system of FIG. 2, for the purpose of reducing a delay accompanied by data transmission and sharing a virtual experience with high real-time characteristics, a peer to peer (P2P) type network in which the terminals 200 directly transmit and receive data is adopted instead of a client/server (C/S) type network in which the terminals 200 transmit and receive data via a server. However, even if the C/S type network is adopted, it is possible to construct the virtual experience sharing system by using the terminals 200 incorporating the data replacement apparatus according to this embodiment.

The terminals 200 are computers configured to control a VR/AR/MR image displayed on an HMD (first device) 10 that can be mounted on a user's head, and each of the terminals 200 is connected to the HMD 10 and a controller (second device) 20 that can be gripped by the user. Incidentally, for each user, two controllers 20 (for both hands) may be prepared or one controller 20 (for one hand) may be prepared. Furthermore, the controller 20 may be mounted on a part other than the hand. Furthermore, although not illustrated in FIG. 2, a base station, which is one of the elements included in a position sensor system for detecting the position of the HMD 10 and/or the position of the controller 20, may be further connected to the terminal 200.

The terminal 200 may be connected to the HMD 10, the controller 20, and/or the base station by wired communication means, for example, a universal serial bus (USB) cable and a high-definition multimedia interface (HDMI) (registered trademark) cable, and may be connected by wireless communication means, for example, Bluetooth, WirelessHD, and wireless home digital interface (WHDI).

The terminal 200 acquires first control data having a value based on the position of the HMD 10 and the position of the controller 20 as described later, and conditionally replaces the first control data with second control data. As will be described later, the second control data has a value not based on the position of the HMD 10 and/or the position of the controller 20. Then, the terminal 200 transmits the second control data to another terminal 200 when the replacement is performed, and otherwise transmits the first control data to the other terminal 200.

The other terminal 200 that has received the first control data or the second control data generates an avatar image of the user based on the received control data. That is, the user can move the head on which the HMD 10 is mounted and the hand gripping the controller 20 to cause the avatar, which is his or her alter ego, to take a free posture.

Furthermore, the terminal 200 may transmit voice data generated by a microphone described later to another terminal 200. The other terminal 200 reproduces and outputs this voice data. With this, it is possible to realize a voice chat between users or an event having realistic sensation such as live in the VR/AR/MR space.

Figure 4:
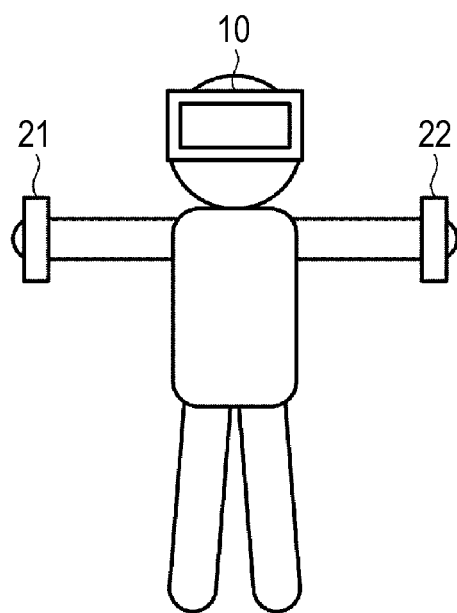
FIG. 4 is a diagram illustrating an example of states of an HMD, a controller, and a user.
Figure 5:
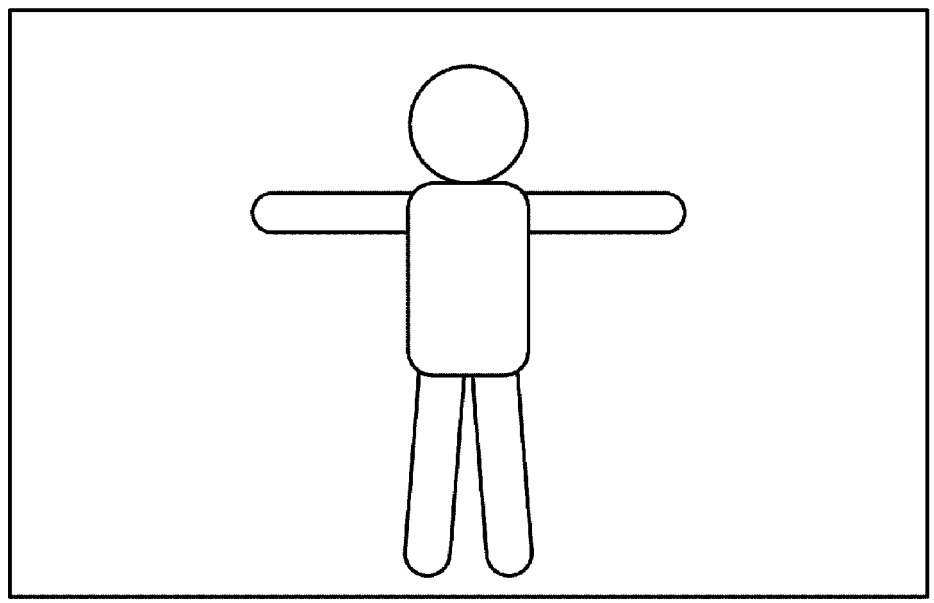
FIG. 5 is a diagram illustrating an avatar image of the user generated using first control data based on positions of the HMD and the controller in FIG. 4.

Specifically, the other terminal 200 determines the position of the head of the avatar image according to the position of the HMD 10 indicated by the received control data, and determines the position of the hand of the avatar image according to the position of the controller 20 indicated by the control data. For example, it is assumed that the user takes the posture illustrated in FIG. 4 in a state of mounting the HMD 10 on the head and gripping a controller 21 (for the right hand) and a controller 22 (for the left hand) (both of which may be the same as the controller 20) by both hands. In this case, the user's avatar will take a posture illustrated in FIG. 5. To control the posture of the avatar, for example, inverse kinematics (IK) technology can be used.

The HMD 10 may include various sensors, a speaker, and a microphone in addition to a display device for displaying VR/AR/MR images including the avatar image. The various sensors may include a motion sensor, a wearing sensor, or some of the elements (markers or cameras described later) included in a position sensor system. The HMD 10 receives image data and voice data from the terminal 200 and outputs the image data and the voice data, or transmits sensor data of various sensors to the terminal 200.

The display device may be a transmissive display or a non-transmissive display. For example, the size and arrangement of the display device are determined so as to cover at least a part of a visual field of the user wearing the HMD 10. The display device may be configured with a left-eye display device and a right-eye display device, or both may be integrated.

The motion sensor can be, for example, an acceleration sensor, a gyroscope, and a magnetic sensor. The sensor data detected by the motion sensor can be used for estimating the posture (for example, inclination) of the user's head. Specifically, based on this sensor data, the Yaw angle, Roll angle, and Pitch angle, which are three-dimensional rotation angles of the user's head, can be estimated, and according to this, a visual axis of the virtual camera that determines the visual field of the user and the posture of the avatar's head can be controlled.

The wearing sensor generates sensor data (event data) indicating that the user is wearing/has removed the HMD 10. Although a mechanism of the wearing sensor is arbitrary, it is possible to generate event data according to, for example, a change in elastic force of a spring provided in the HMD 10 and a change in current flowing between pads that contact a part of the body such as a user's nose when the HMD 10 is worn by the user.

The speaker receives voice data from the terminal 200 and outputs a voice based on the voice data. The speaker is typically a headphone type, but may be configured as a speaker system other than the headphone type. The speaker may be separate from the HMD 10. The microphone collects a voice (mainly a user's utterance). The microphone generates voice data based on the collected voice and sends the voice data to the terminal 200.

The controller 20 may include, for example, a motion sensor similar to the HMD 10 and a part of the elements included in the position sensor system, in addition to a button that receives a user input. Furthermore, the controller 20 may include a grip sensor that generates sensor data (event data) indicating that the user is gripping/has hand-released the controller 20. Although the mechanism of the grip sensor is arbitrary, it is possible to generate event data according to, for example, a change in pressure applied to the controller due to gripping force of the user and a change in electrostatic capacitance between a sensor electrode provided on a surface of the controller 20 and the human body. The controller 20 transmits user input data and sensor data of various sensors to the terminal 200.

The position sensor system is realized by, for example, a combination of a camera (position tracking camera) and a marker (also called a tracker). The marker may be an infrared light or visible light emitter (for example, a light emitting diode (LED)), or may be a reflective material for reflecting infrared light or visible light emitted from the emitter when photographing with the camera. The camera can be an infrared sensor when the marker emits or reflects infrared light, or a visible light camera when the marker emits or reflects visible light.

Typically, a plurality of markers are attached to the HMD 10/controller 20, and the camera is attached to a device (base station) installed at a position apart from the HMD 10/controller 20. The position of the HMD 10/controller 20 can be estimated based on a photographed image of the camera. Specifically, the base station can detect the position of a detection point, and inclination, emission intensity based on the photographed image. The base station may calculate position (coordinates) data of the HMD 10/controller 20 based on data of the detection point, or the calculation may be entrusted to the terminal 200. Incidentally, as a modification example, the camera may be provided on the HMD 10/controller 20 side and the marker may be provided on the base station side. Further, in addition to the markers attached to the HMD 10 and the controller 20, additional markers may be attached to a joint and peripheral portion of the user. With this, it is possible to more accurately estimate the posture of the user.

A hardware configuration of the terminal 200 will be described below. The terminal 200 can be various electronic devices that can be a control device of the HMD 10, for example, a personal computer (PC), a mobile terminal (for example, a tablet, a phablet, a smartphone, a laptop, a feature phone, a wearable device, and a portable game machine), and a stationary game machine, but is not limited thereto.

Incidentally, the terminal 200 does not necessarily have to be a separate body from the HMD 10 or another device (controller 20 or base station). For example, the terminal 200 may be built in the HMD 10 or the base station, or the terminal 200 may be treated as the controller 20.

The terminal 200 includes a processor that performs processing as a data replacement apparatus according to the embodiment, input/output control, communication control, and image/voice processing. Here, the processor is typically a central processing unit (CPU) and/or a graphics processing unit (GPU), but may also be a microcomputer, a field programmable gate array (FPGA), a digital signal processor (DSP), or another general-purpose or dedicated processor.

In addition, the terminal 200 includes a memory for temporarily storing a program executed by a processor to realize such processing and data used by the processor, for example, image data that is the basis for various objects such as avatars and backgrounds to produce a VR/AR/MR experience. The memory may include a random access memory (RAM) having a work area in which such a program/data is developed.

Incidentally, the terminal 200 may treat all data in an on-memory state, or some data may be saved in an auxiliary storage device. The auxiliary storage device may be, for example, a hard disc drive (HDD), a solid state drive (SSD), and a flash memory built in or externally attached to the terminal 200, or may be a database server accessible from the terminal 200.

The terminal 200 can further use a communication I/F (interface) for connecting to the network. The communication I/F may be built in the terminal 200 or externally attached to the terminal 200. The communication I/F is a module for communicating with another terminal 200 and/or an external apparatus, for example, the HMD 10, the controller 20, and the base station, and may include a signal processing circuit for transmission and reception, an antenna, and a local area network (LAN) terminal. The communication I/F may be, for example, a module for wide area communication such as mobile communication, a module for wireless/wired LAN, and a module for Bluetooth (registered trademark).

The terminal 200 can further use an input/output I/F for connecting a cable to an external apparatus, for example, the HMD 10, the controller 20, and the base station. The input/output I/F is a USB terminal, a digital visual interface (DVI) terminal, or an HDMI terminal, another terminal for a data transfer cable.

The terminal 200 may further include a bus for transferring data between each element, for example, a processor, a memory, an auxiliary storage device, a communication I/F, and an input/output I/F.

Subsequently, the data replacement apparatus according to the embodiment will be described. In FIG. 1, a functional configuration of the data replacement apparatus 100 according to the embodiment is illustrated. The data replacement apparatus 100 includes a data acquisition unit 101, a state determination unit 102, and a data replacement unit 103.

The data acquisition unit 101 can be realized by, for example, the communication I/F, the input/output I/F, or the processor. The data acquisition unit 101 acquires first control data and sends the first control data to the state determination unit 102. Here, the first control data has a value based on the position of the HMD 10 and the position of the controller 20. As mentioned above, the position of the HMD 10/controller 20 can be estimated using the position sensor system.

When the external apparatus, for example, the HMD 10, the controller 20 and/or the base station estimates the position of the HMD 10/controller 20 and generates the first control data, the data acquisition unit 101 may acquire the first control data from this external apparatus. On the other hand, when (a position estimation unit (not illustrated) of) the terminal 200 estimates the position of the HMD 10/controller 20 based on output data (for example, data indicating the position of the detection point, inclination, and emission intensity) of the position sensor system and generates the first control data, the data acquisition unit 101 may acquire the first control data from the memory of the terminal 200 or the auxiliary storage device.

In the above description, it is assumed that the data replacement apparatus 100 conditionally replaces the first control data before transmitting the first control data to another terminal 200. However, as described in Modification Example 1 described later below, it is also possible that the terminal 200 transmits the first control data of itself to another terminal 200 without replacement and the data replacement apparatus 100 incorporated in the other terminal 200 conditionally performs replacement on the received first control data. Assuming the latter configuration, the data acquisition unit 101 will acquire the first control data received via the network.

Incidentally, when the HMD 10/controller 20 includes the wearing sensor/grip sensor, the data acquisition unit 101 may further acquire event data from the wearing sensor/grip sensor and send the event data to the state determination unit 102.

The state determination unit 102 can be realized by, for example, the processor. The state determination unit 102 receives the first control data (and event data) from the data acquisition unit 101. The state determination unit 102 determines whether or not a prescribed replacement start condition is satisfied for the first control data. Then, the state determination unit 102 sends the first control data together with data indicating the determination result to the data replacement unit 103.

Here, the state determination unit 102 may determine whether or not the replacement start condition is satisfied based on the first control data, or may determine whether or not the replacement start condition is satisfied based on the event data. The replacement start condition can be defined to be satisfied, for example, in a case where it is expected that an avatar will take an unnatural posture when the avatar is controlled faithfully to the first control data.

Specifically, the state determination unit 102 may determine whether or not the HMD 10 is mounted on the user's head, as an example of the replacement start condition. When the HMD 10 is removed from the user's head, the position of the HMD 10 is not likely to be linked to the position of the user's head any more, and is likely to be moved to an extremely low position or high position, or a position extremely distant from the position of the user's hand (more accurately, the controller 20). In such a case, when the position of the avatar's head is determined according to the position of the HMD 10, the posture of the avatar is likely to be unnatural.

The state determination unit 102 can determine whether or not the HMD 10 is mounted on the user's head, for example, based on event data output from the wearing sensor when a mounting/removing event of the HMD 10 is generated.

In addition, the user is likely to lift the HMD 10 to a position significantly higher than the head when removing the HMD 10 from the head. Therefore, the state determination unit 102 may determine whether or not the first control data has a value indicating that the height of the HMD 10 is a prescribed first height or more, as an example of the replacement start condition.

The first height may mean an upper limit of the head height required because the avatar's posture is not defined as unnatural. The first height may be determined in units of user or determined in units of virtual experience sharing system. As an example, the first height may be a height obtained by adding an offset to a height of a head of an individual user or an average user.

In addition, the user may place the HMD 10 on a lowland, for example, a floor after removing the HMD 10 from the head. In such a case, when the position of the avatar's head is determined according to the position of the HMD 10, the avatar is likely to take a posture in which the avatar falls down with the head attached to the lowland, for example.

Figure 6:
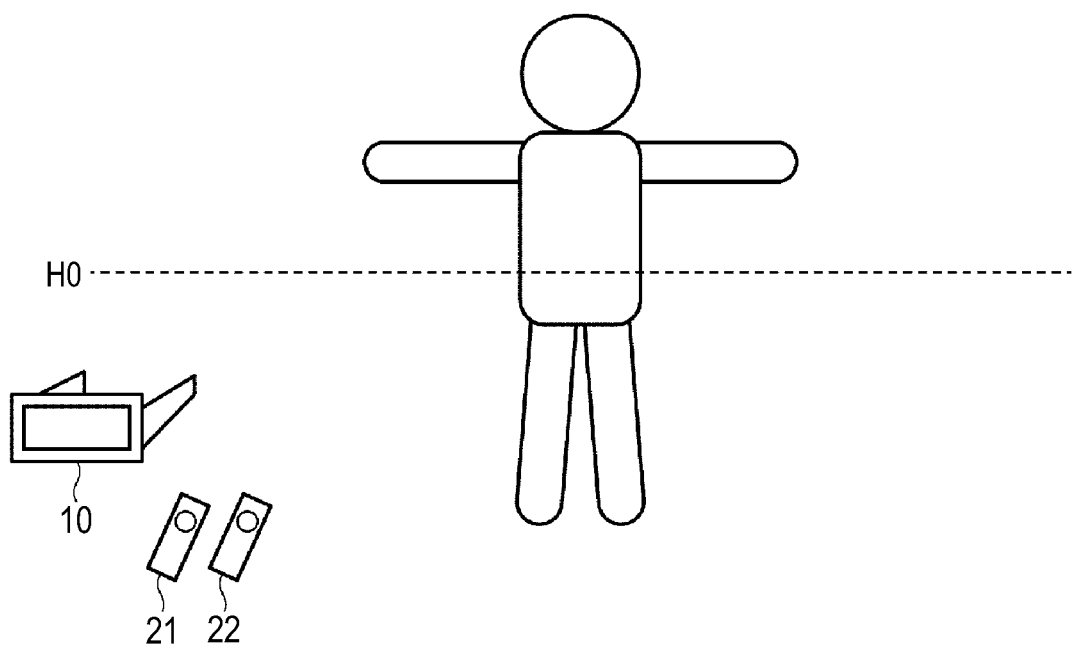
FIG. 6 is a diagram illustrating another example of the states of the HMD, the controller, and the user.

Therefore, the state determination unit 102 may determine whether or not the first control data has a value indicating that the height of the HMD 10 is smaller than a prescribed second height, as an example of the replacement start condition. In the example of FIG. 6, since the second height is determined as H0 and the height of the HMD 10 is lower than H0, the state determination unit 102 determines that the replacement start condition is satisfied.

The second height may mean a lower limit of the height of the head required because the avatar's posture is not defined as unnatural. The second height may be determined in units of user or determined in units of virtual experience sharing system. As an example, the second height may be an individual user or average user's waist height, knee height, and head height when bent forward.

Figure 8:
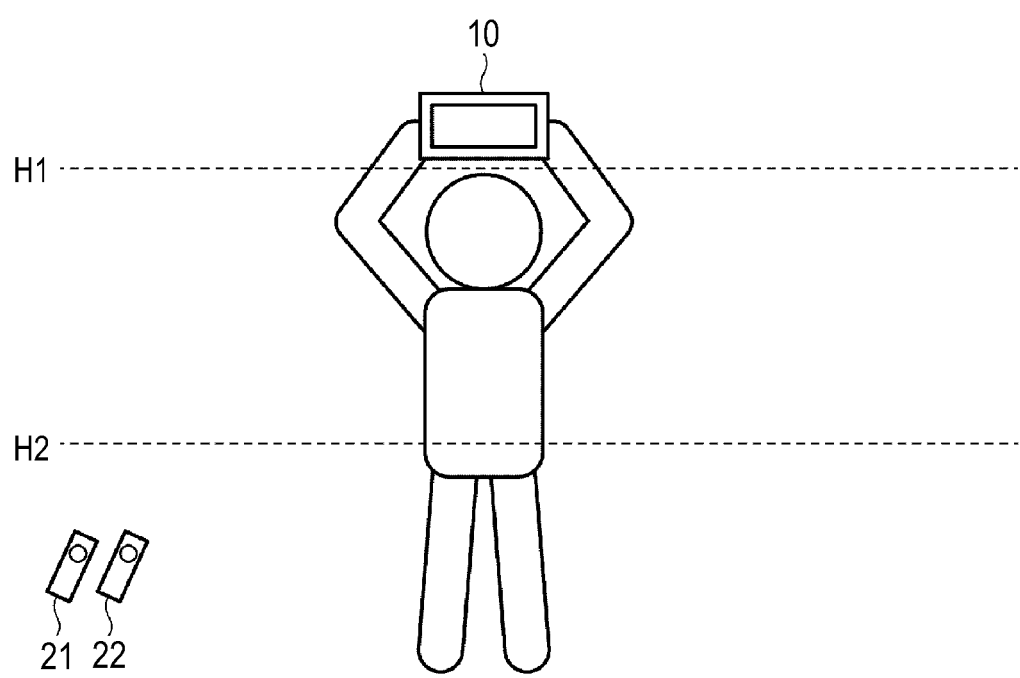
FIG. 8 is a diagram illustrating another example of the states of the HMD, the controller, and the user.

In addition, the replacement start condition may be that the first control data has a value indicating that the height of the HMD 10 is the first height or more, or smaller than the second height. In the example of FIG. 8, since the first height and the second height are determined as H1 and H2, respectively, and the height of the HMD 10 is H1 or more, the state determination unit 102 determines that the replacement start condition is satisfied. With this, when the height of the HMD 10 does not fall within a range from the lower limit value to the upper limit value, it is possible to perform data replacement and prevent the avatar's posture from collapsing.

The user is likely to hand-release the controller 20 to free his or her hands before removing the HMD 10 from the head. Therefore, as an example of the replacement start condition, the state determination unit 102 may determine whether or not the first control data has a value indicating that the controller 20 is stationary, in addition to any of the conditions regarding the height of the HMD 10. Whether or not the controller 20 is stationary can be determined based on, for example, a history of the position of the controller 20 in the first control data and output data of the motion sensor or the grip sensor of the controller 20.

Furthermore, as long as the user mounts the HMD 10 on the head and grips the controller 20, the distance between the HMD 10 and the controller 20 does not become extremely large. In other words, when the distance between the HMD 10 and the controller 20 is extremely large, the HMD 10 and/or the controller 20 is not likely to be attached to the user's body. Therefore, in such a case, when the avatar is controlled faithfully to the position data of the HMD 10/controller 20, the avatar is likely to take an unnatural posture. Therefore, the state determination unit 102 may determine whether or not the first control data has a value indicating that the distance between the HMD 10 and the controller 20 is a prescribed distance or more, as an example of the replacement start condition.

The prescribed distance may mean an upper limit of the distance between the head and the hand required because the avatar's posture is not defined as unnatural. The prescribed distance may be determined in units of user or determined in units of virtual experience sharing system. As an example, the prescribed distance may be determined based on a distance from the head to the hand of an individual user or average user. Specifically, the prescribed distance may be a distance obtained by adding an offset to the distance from the head to the hand of the user when taking a posture in which the distance from the head to the hand is the largest, for example, when standing up straight.

Incidentally, after once determining that the replacement start condition is satisfied, the state determination unit 102 determines whether or not a prescribed replacement end condition is satisfied. Then, after once determining that the replacement end condition is satisfied, the state determination unit 102 determines again whether or not the replacement start condition is satisfied. The replacement end condition can be defined to be satisfied, for example, when it is expected that the avatar will not take an unnatural posture even if the avatar is controlled faithfully to the first control data. By defining the replacement end condition in this way, it is possible to return the avatar again to the same or different natural posture (for example, stand up and wave hands) without interposing the unnatural posture after shifting the avatar from a natural posture (for example, upright) to a dummy posture (for example, bend).

The replacement end condition can typically correspond to a negation of the replacement start condition, that is, the replacement start condition not being satisfied. For example, when the replacement start condition is that "the HMD 10 is mounted on the user's head", the replacement end condition may be determined that "the HMD 10 is not mounted on the user's head".

However, the replacement end condition may not correspond to the negation of the replacement start condition. Specifically, when the replacement start condition is that "the first control data has a value indicating that the height of the HMD 10 is the first height or more and indicating that the controller 20 is stationary", the replacement end condition may be that "the first control data has a value indicating that the height of the HMD 10 is smaller than the first height (and the second height or more) and indicating that the controller 20 is not stationary".

The data replacement unit 103 can be realized by the processor. When it is determined that the replacement start condition is satisfied, the data replacement unit 103 replaces the first control data with the second control data and outputs the second control data to the outside of the data replacement apparatus 100. On the other hand, when it is not determined that the replacement start condition is satisfied, the data replacement unit 103 outputs the first control data as it is to the outside of the data replacement apparatus 100. Incidentally, once the data replacement unit 103 starts the data replacement, the data replacement unit 103 continues the data replacement until the state determination unit 102 determines that the replacement end condition is satisfied. Here, the second control data is dummy data for preventing the avatar from taking an unnatural posture, and a specific example of the second control data will be described below.

Figure 7:
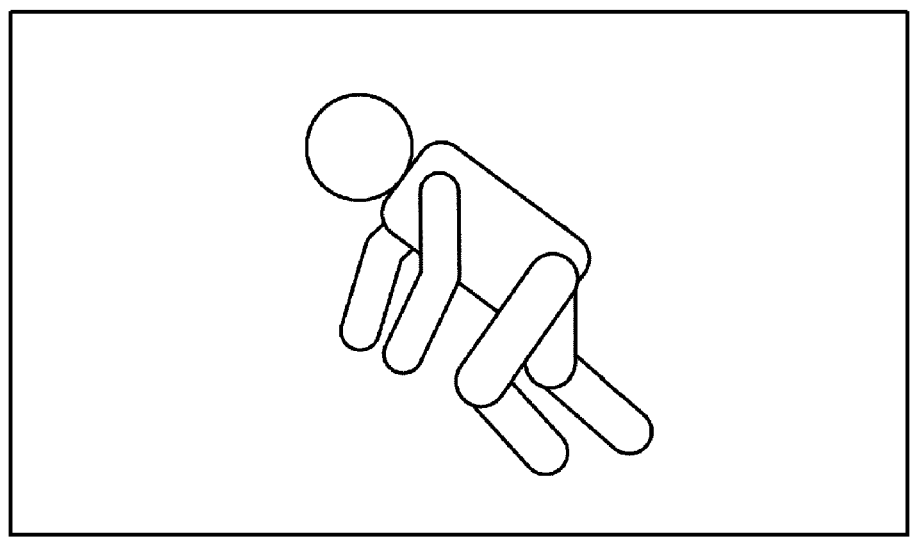
FIG. 7 is a diagram illustrating an avatar image of the user generated using second control data obtained by replacing the first control data based on the positions of the HMD and the controller in FIG. 6.

For example, when the replacement start condition is that the HMD 10 is mounted on the user's head or a condition that is related to the height of the HMD 10, the second control data may have a value not based on the height of the HMD 10. Specifically, the second control data may have a value indicating that the height of the HMD 10 is a height which is smaller than the first height, a height which is the second height or more, or a height which is smaller than the first height and is the second height or more. With this, for example, even when the height of the HMD 10 is smaller than the second height H0 as in the example of FIG. 6, the avatar's head does not unnaturally lower, and the avatar can be made to take a bent posture as illustrated in FIG. 7, for example. In addition to the bent posture, depending on algorithm for controlling the avatar's posture and the height of the HMD 10 indicated by the second control data, it is possible for the avatar to take various postures such as sitting, kneeling, or standing up.

In addition, when the replacement start condition is a condition that is related to the distance between the HMD 10 and the controller 20, the second control data may have a value not based on the position of the HMD 10 and/or the position of the controller 20. Specifically, the second control data may have a value indicating that the distance between the HMD 10 and the controller 20 is smaller than the prescribed distance.

When the user is not wearing the HMD 10, the HMD 10 can be expected to be stationary, and when the user is not gripping the controller 20, the controller 20 can be expected to be stationary. Therefore, the second control data may have a value not based on the position of one or both of the HMD 10 and the controller 20 which are stationary. In other words, in the second control data, the position of the device (non-stationary device), which is not stationary, of the HMD 10 and the controller 20 in the first control data may be maintained, and the position of the other device may be rewritten to a position that is smaller than the prescribed distance from the position of the non-stationary device. Whether or not the HMD 10/controller 20 is stationary can be determined based on, for example, the history of the position of the HMD 10/controller 20 in the first control data, or the output data of the motion sensor or the wearing sensor/grip sensor of the HMD 10/controller 20.

Figure 3:
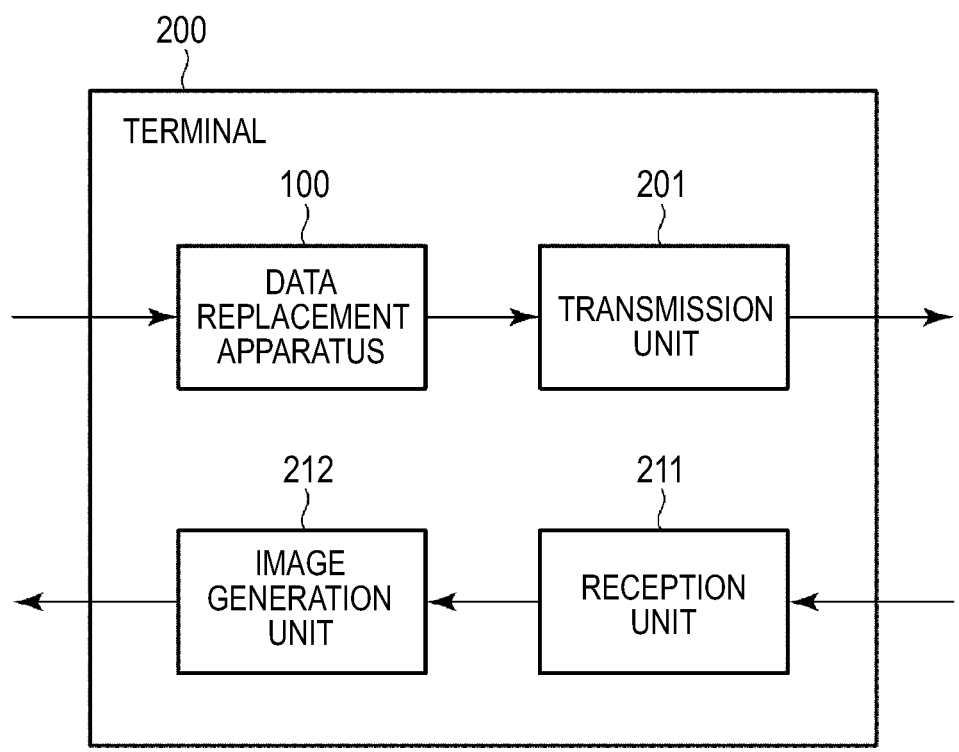
FIG. 3 is a block diagram illustrating an example of the terminal incorporating the data replacement apparatus according to the embodiment.

Subsequently, the terminal 200 incorporating the data replacement apparatus 100 will be described. In FIG. 3, a functional configuration of the terminal 200 incorporating the data replacement apparatus 100 is illustrated. The terminal 200 includes the data replacement apparatus 100, a transmission unit 201, a reception unit 211, and an image generation unit 212.

The transmission unit 201 can be realized by the communication I/F. The transmission unit 201 receives output data of the data replacement apparatus 100 and transmits the output data to another terminal 200 that is a communication partner via the network. Here, as described above, the output data of the data replacement apparatus 100 is the second control data when the data replacement is performed, and is the first control data otherwise.

Incidentally, the transmission unit 201 may receive voice data generated by a microphone in addition to the first or second control data, and may transmit the voice data to another terminal 200 that is a communication partner via the network.

The reception unit 211 can be realized by the communication I/F. The reception unit 211 receives control data for controlling the user's avatar of another terminal 200 from the other terminal 200 that is a communication partner via the network. The control data to be received is likely to be the first control data or is likely to be the second control data, but in either case, the control data does not affect processing in a subsequent stage. The reception unit 211 sends the control data to the image generation unit 212.

Incidentally, the reception unit 211 can receive voice data in addition to control data. The reception unit 211 may send the voice data to a voice processing unit (not illustrated). The voice processing unit reproduces the voice data and causes the speaker to output voice.

The image generation unit 212 can be realized by the processor. The image generation unit 212 generates (updates) a VR/AR/MR image including control of a user's avatar image corresponding to control data, for example, based on the image data of the object stored in the memory of the terminal 200 or the auxiliary storage device and the control data from the reception unit 211. The control data here corresponds to the second control data when the data replacement is performed, and corresponds to the first control data otherwise. The image generation unit 212 sends the generated image data to the HMD 10.

As described above, the image generation unit 212 may determine the position of the head/hand of the avatar image according to the position of the HMD 10/controller 20 indicated by the control data, and may control the avatar's posture, for example, by using the IK technology.

Figure 9:
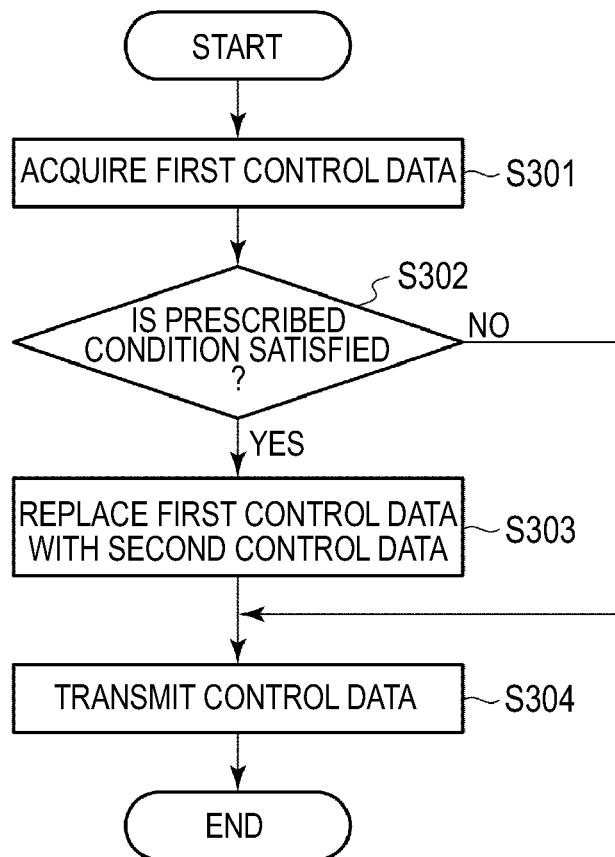
FIG. 9 is a flowchart illustrating an operation of the terminal of FIG. 3.

An operation of the terminal 200 will be described below with reference to FIG. 9. The operation in FIG. 9 is performed every time the first control data is generated.

First, the data acquisition unit 101 in the data replacement apparatus 100 acquires the first control data (step S301). Then, the state determination unit 102 in the data replacement apparatus 100 determines whether or not a prescribed condition is satisfied (step S302). When the prescribed condition is satisfied, the process proceeds to step S303, and otherwise, the process skips step S303 and proceeds to step S304.

Incidentally, the prescribed condition in step S302 may mean the replacement start condition when the replacement start condition is not satisfied even once, mean a condition corresponding to the negation of the replacement end condition from when the replacement start condition is satisfied to when the replacement end condition is satisfied, and mean the replacement start condition from when the replacement end condition is satisfied to when the replacement start condition is satisfied again.

In step S303, the data replacement unit 103 in the data replacement apparatus 100 replaces the first control data with the second control data having a value not based on the position of the HMD 10 and/or the position of the controller 20.

Next, the transmission unit 201 transmits the control data (step S304), and the operation of FIG. 9 ends. Incidentally, when step S303 is executed before step S304, the transmission unit 201 transmits the second control data. On the other hand, when step S303 is skipped before step S304, the transmission unit 201 transmits the first control data.

As described above, when the prescribed replacement start condition is satisfied, the data replacement apparatus according to the embodiment replaces the first control data having a value based on the positions of the HMD and the controller with the second control data having a value not based on the position of the HMD and/or the position of the controller. Therefore, according to this data replacement apparatus, for example, in a case where the avatar is in danger of taking an unnatural posture when controlling the avatar faithfully to the first control data, the avatar can be controlled using dummy second control data instead of the first control data. That is, regardless of actual positions of the HMD and the controller, the avatar's posture is maintained so as not to be unnatural, and thus it is possible to prevent at least deterioration of the virtual experience of the user due to unnaturalness of the avatar image.

MODIFICATION EXAMPLE 1

Figure 10:
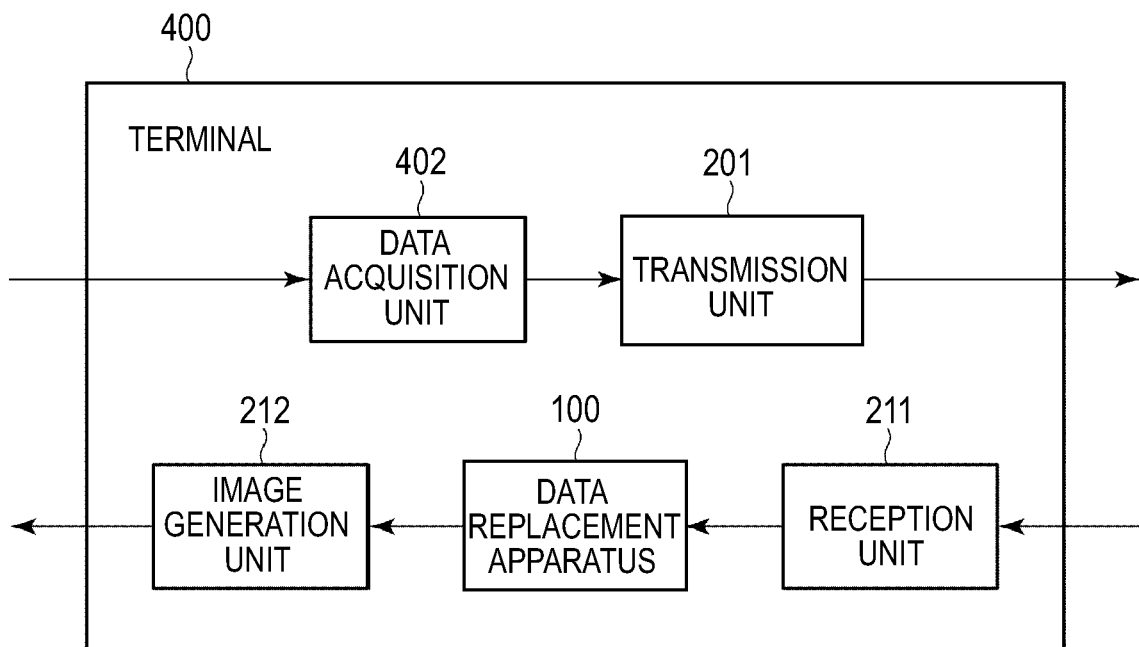
FIG. 10 is a block diagram illustrating a modification example of FIG. 3.

In the embodiment, data replacement for the first control data is conditionally performed at the terminal that is a transmission source of the first control data. However, the data replacement for the first control data may be performed at the terminal that is a destination of the first control data rather than the transmission source. A terminal 400 of such a modification example is illustrated in FIG. 10.

The terminal 400 includes a data acquisition unit 402, the transmission unit 201, the reception unit 211, the data replacement apparatus 100, and the image generation unit 212. Here, since the transmission unit 201, the reception unit 211, the data replacement apparatus 100, and the image generation unit 212 are the same as or similar to the elements having the same names in FIG. 3, the differences between the elements in both terminals and the data acquisition unit 402 will be mainly described in the following description.

The data acquisition unit 402 can be realized by, for example, the communication I/F, input/output I/F, or a processor. The data acquisition unit 402 acquires the first control data and sends the first control data to the transmission unit 201. As described above, the position of the HMD 10/controller 20 can be estimated using a position sensor system.

When the external apparatus, for example, the HMD 10, the controller 20, or the base station estimates the position of the HMD 10/controller 20 to generate the first control data, it suffices for the data acquisition unit 402 to acquire the first control data from the external apparatus. On the other hand, when (a position estimation unit (not illustrated) of) the terminal 200 estimates the position of the HMD 10/controller 20 based on the output data (for example, data indicating the position of the detection point, inclination, and emission intensity) of the position sensor system to generate the first control data, it suffices for the data acquisition unit 402 to acquire the first control data from the memory of the terminal 200 or the auxiliary storage device.

Incidentally, when the HMD 10/controller 20 includes the wearing sensor/grip sensor, the data acquisition unit 402 may further acquire event data from this wearing sensor/grip sensor and send the event data to the transmission unit 201. Further, in this case, the transmission unit 201 may transmit event data to the terminal 400 in addition to the first control data in order to determine the prescribed condition in the terminal 400 that is the destination. Furthermore, the reception unit 211 can also receive event data in addition to the first control data transmitted from another terminal 400 and send the event data to the data replacement apparatus 100.

As described above, in this modification example, data replacement processing is performed in a distributed manner at the terminal that is the destination of the first control data rather than the transmission source. Therefore, according to this modification, the load on the transmission source can be reduced.

MODIFICATION EXAMPLE 2

In the embodiments, the respective terminals transmit data to each other via a P2P type network. On the other hand, the respective terminals can also transmit data to each other via a C/S type network. Then, in this case, the data replacement apparatus 100 may be incorporated in the server. Then, instead of relaying the first control data between the terminals, the server may conditionally perform data replacement on the first control data received from the terminal that is the transmission source, and then transmit the first or second control data to the terminal that is the destination.

By adopting the C/S type network as in this modification example, the transmission delay of control data is likely to be larger than that in the case of adopting the P2P type network, but since data replacement processing is concentratedly performed in the server, the load on each terminal can be reduced.

The embodiments merely illustrate a specific example for helping understanding of the concept of the invention, and are not intended to limit the scope of the invention. In the embodiment, an addition, deletion, or conversion of various constitutional elements may be made without departing from the gist of the invention.

Although some functional units have been described in the embodiments, these are merely examples of mounting of each functional unit. For example, a plurality of functional units described as being mounted on one device may be mounted on a plurality of separate devices, or conversely, the functional unit described as being mounted over a plurality of separate devices may be mounted on one device.

The various functional units described in the respective embodiments may be realized by using a circuit. The circuit may be a dedicated circuit that realizes a specific function or a general-purpose circuit such as a processor.

At least a part of processing in the respective embodiments can also be realized by, for example, using a processor mounted on a general-purpose computer as basic hardware. A program that realizes the processing may be stored in a computer-readable recording medium and provided. The program is stored in the recording medium as an installable file or an executable file. The recording medium may be a magnetic disk, an optical disk (CD-ROM, CD-R, DVD, and the like), a magneto-optical disk (MO and the like), or a semiconductor memory. The recording medium may be any medium as long as it can store the program and can be read by a computer. Further, the program that realizes the processing may be stored on a computer (server) connected to a network such as the Internet and downloaded by a computer (client) via the network.

The invention claimed is:

1. A data replacement apparatus comprising:
    an acquisition unit that acquires first control data having a value based on an actual position of a first device which can be mounted on a user's head and an actual position of a second device which can be gripped by a user and which is used in conjunction with the first device;

a determination unit that determines whether or not a prescribed condition is satisfied; and a replacement unit that replaces the first control data with second control data when it is determined that the condition is satisfied, wherein the second control data has a value describing positions of the first device and the second device in which the actual position of the first device and/or the actual position of the second device are replaced with at least one artificial position component;

the determination unit determines whether or not the first device is mounted on the user's head, and when it is determined that the first device is not mounted on the user's head, the replacement unit replaces the first control data with second control data in which the at least one artificial position component is an artificial height of the first device.

2. The data replacement apparatus according to claim 1, wherein the determination unit determines whether or not the prescribed condition is satisfied, based on at least a height of the first device indicated by a value that the first control data has.

3. The data replacement apparatus according to claim 2, wherein the determination unit determines whether or not the first control data has a value indicating that the height of the first device is smaller than a prescribed height, and when it is determined that the first control data has the value indicating that the height of the first device is smaller than the prescribed height, the replacement unit replaces the first control data with second control data.

4. The data replacement apparatus according to claim 3, wherein the prescribed height or more is used as the artificial height of the first device.

5. The data replacement apparatus according to claim 2, wherein:

the determination unit determines whether or not the first control data has a value indicating that the height of the first device is a prescribed first height or more, or smaller than a prescribed second height;

when it is determined that the first control data has the value indicating that the height of the first device is the first height or more, or smaller than the second height, the replacement unit replaces the first control data with second control data; and the second height is lower than the first height.

6. The data replacement apparatus according to claim 2, wherein:

the determination unit determines whether or not the first control data has a value indicating that the height of the first device is a prescribed first height or more, or smaller than a prescribed second height and indicating that the second device is stationary;

when it is determined that the first control data has the value indicating that the height of the first device is the first height or more, or smaller than the second height and indicating that the second device is stationary, the replacement unit replaces the first control data with second control data; and the second height is lower than the first height.

7. The data replacement apparatus according to claim 6, wherein:

after determining that the first control data has the value indicating that the height of the first device is the first height or more, or smaller than the second height, and indicating that the second device is stationary, the determination unit further determines whether or not the first control data has a value indicating that the height of the first device is smaller than the first height and is the second height or more and indicating that the second device is not stationary; and the replacement unit continues replacing the first control data with the second control data from when it is determined that the first control data has the value indicating that the height of the first device is the first height or more, or smaller than the second height and indicating that the second device is stationary to when it is determined that the first control data has the value indicating that the height of the first device is smaller than the first height and is the second height or more and indicating that the second device is not stationary.

8. The data replacement apparatus according to claim 5, wherein the second control data has a value indicating that the height of the first device is smaller than the first height and is the second height or more.

9. The data replacement apparatus according to claim 5, wherein the first height is a height of the head of the user or more.

10. The data replacement apparatus according to claim 1, wherein:

the determination unit determines whether or not the first control data has a value indicating that a distance between the first device and the second device is a prescribed distance or more; and when it is determined that the first control data has the value indicating that the distance between the first device and the second device is the prescribed distance or more, the replacement unit replaces the first control data with second control data.

11. A data replacement apparatus comprising:

an acquisition unit that acquires first control data having a value based on an actual position of a first device which can be mounted on a user's head and an actual position of a second device which can be gripped by a user and which is used in conjunction with the first device;

a determination unit that determines whether or not a prescribed condition is satisfied; and a replacement unit that replaces the first control data with second control data when it is determined that the condition is satisfied, wherein:

the second control data has a value describing positions of the first device and the second device in which the actual position of the first device and/or the actual position of the second device are replaced with at least one artificial position component;

the determination unit determines whether or not the first control data has a value indicating that a distance between the first device and the second device is a prescribed distance or more, and when it is determined that the first control data has the value indicating that the distance between the first device and the second device is the prescribed distance or more, the replacement unit replaces the first control data with second control data; and the second control data has a value not based on the position of the first device when the first control data has a value indicating that the first device is stationary, and has a value not based on the position of the second device when the first control data has a value indicating that the second device is stationary.

12. The data replacement apparatus according to claim 10, wherein
the second control data has a value indicating that the distance between the first device and the second device is smaller than the prescribed distance.

13. A terminal comprising:
the data replacement apparatus according to claim 1; and
an image generation unit that generates an avatar image of the user based on the second control data when the first control data is replaced by the second control data.

14. A data replacement program that causes a computer to function as:
means for acquiring first control data having a value based on an actual position of a first device which can be mounted on a user's head and an actual position of a second device which can be gripped by a user and which is used in conjunction with the first device;
means for determining whether or not a prescribed condition is satisfied; and
means for replacing the first control data with second control data when it is determined that the condition is satisfied, wherein:
the second control data has a value describing positions of the first device and the second device in which the actual position of the first device and/or the actual position of the second device are replaced with at least one artificial position component; and
when it is determined that the first device is not mounted on the user's head, the means for replacing replaces the first control data with second control data in which the at least one artificial position component is an artificial height of the first device.

* * * * *